United States Patent
Stapperfenne et al.

(10) Patent No.: US 7,198,849 B2
(45) Date of Patent: Apr. 3, 2007

(54) SOLVENT-CONTAINING COATING COMPOSITIONS

(75) Inventors: Uwe Stapperfenne, Wuelfrath (DE); Giselher Franzmann, Witten (DE); Doris Faber, Dorsten (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/892,134

(22) Filed: Jul. 16, 2004

(65) Prior Publication Data

US 2005/0014012 A1 Jan. 20, 2005

(30) Foreign Application Priority Data

Jul. 18, 2003 (DE) ................. 103 32 723

(51) Int. Cl.
*C08G 18/40* (2006.01)

(52) U.S. Cl. ................ 428/425.8; 428/423.1; 525/424; 525/427; 525/452; 525/454; 525/458; 525/460; 525/480

(58) Field of Classification Search ........ 525/427, 525/424, 480, 453, 454, 460, 458; 428/423.1, 428/425.8
See application file for complete search history.

(56) References Cited

U.S. PATENT DOCUMENTS

| | | | | |
|---|---|---|---|---|
| 2,470,130 | A | * | 5/1949 | Bender et al. ............. 524/37 |
| 4,680,346 | A | * | 7/1987 | Carson et al. ............ 525/486 |
| 5,424,340 | A | * | 6/1995 | Pfeil et al. ................ 523/403 |
| 5,916,979 | A | * | 6/1999 | Koegler et al. ........... 525/440 |

FOREIGN PATENT DOCUMENTS

EP  0 145 006  6/1985

OTHER PUBLICATIONS

Patent Abstracts of Japan, JP 2000-007984, Jan. 11, 2000.

* cited by examiner

*Primary Examiner*—Irina S. Zemel
(74) *Attorney, Agent, or Firm*—Oblon, Spivak, McClelland, Maier & Neustadt, P.C.

(57) ABSTRACT

A solvent-containing coating composition contains at least one hydroxyl-containing saturated copolyester, a phenol-formaldehyde resin, a benzoguanamine-formaldehyde resin and/or a blocked polyisocyanate, a catalyst and at least one solvent, and can further contain aids and additives.

29 Claims, No Drawings

SOLVENT-CONTAINING COATING COMPOSITIONS

BACKGROUND OF THE INVENTION

1. Field of the Invention

The present invention relates to coating compositions. In particular, the present invention relates to solvent-containing coating compositions containing at least one hydroxyl-containing saturated copolyester, a phenol-formaldehyde resin, a benzoguanamine-formaldehyde resin and/or a blocked polyisocyanate, catalysts, solvents and, if appropriate, aids and additives.

2. Discussion of the Background

Coating agents are used for the external and internal lacquering of metal packaging articles. The coating agents are free of polyvinyl chloride (PVC), bisphenol A (BPA) and also bisphenol A diglycidyl ether (BADGE), bisphenol F diglycidyl ether (BFDGE), novolac glycidyl ether (NOGE) and derivatives thereof. The coating agents are suitable for roller coating of metal sheets or coils, in particular for highly deformed metal packages, having excellent adhesion and stability to sterilization, especially in acid media, such as acetic acid and lactic acid.

Metal packaging articles for foods and drinks, such as cans, tubes and closures, are customarily provided with an organic coating (see "Canmaking, The Technology of Metal Protection and Decoration" T. A. Turner, Blackie Academic & Professional, London, 1998, page 82; "Polymeric Materials Science and Engineering", Vol. 65, fall meeting 1991 New York, pages 277–278), in order firstly to protect the metal from corrosion, to ensure further processing, and secondly to protect the filled contents, so that the food constituents are retained. Also, the color, texture and flavor of the filled contents must not be changed over the period of the storage life of the metal packaging articles. Therefore, transfers of metal into the filled contents are also to be prevented by the organic coating. Furthermore, the filled contents must not be affected or changed by the lacquer layer itself or parts of the lacquer layer which have been leached out ("Verpackung von Lebensmitteln" [Packaging of foods] Rudolf Heiss, Springer Verlag, Berlin 1980, page 234 ff).

The coating agents are applied in the roller coating process either continuously on coil lines or batchwise on sheet coating lines to thin metals such as aluminum, tinplate or chromed steel (TFS=tin free steel) and then reacted at high temperatures.

The coated metals thus produced are then shaped to form the desired metal packaging articles by processes such as, for example, deep-drawing, stamping, creasing and flanging. This machining requires very high flexibility and excellent adhesion of the coating agents used. They must not experience any change in the protective function due to the reshaping processes and must then have perfect adhesion and intact surfaces.

Many metal packaging articles, after filling with the foods, are subjected to processes for preservation. These are, for example, pasteurization or sterilization; after these thermal processes also, the coating agents must not have any change with respect to protective function, adhesion and surfaces.

Currently, coating agents especially for direct food contact, based on epoxy-phenol lacquers, are used. These coating agents are called "gold lacquers" (see "Ullmann's Encyclopedia of Industrial Chemistry", Vol. A 18, VCH Verlagsgesellschaft, Weinheim 1991, page 527). These lacquers exhibit good adhesion and are particularly highly suitable for aggressive filled contents, in particular for acid filled contents. If particularly high demands are made of the flexibility of the coating agents, frequently PVC dispersions are used. These PVC dispersions are termed organosols, and are distinguished by particularly good adhesion and good deep-drawing properties.

However, not only the epoxy-phenol lacquers but also the organosols contain BADGE (bisphenol A diglycidyl ether (2,2'-bis(4-hydroxyphenyl)propane bis(2,3-epoxypropyl) ether) and/or BPA [bisphenol A=(2,2'-bis(4-hydroxyphenyl) propane)] are used. In addition, BFDGE and NOGE are also used. The PVC organosols additionally contain PVC.

Currently, the food packaging industry and consumer groups are demanding coated metal packaging articles in which the lacquers are firstly completely free from epoxy compounds (BADGE, BFDGE, NOGE and derivatives thereof), bisphenol A and PVC—and derivatives thereof, and secondly have comparable properties to the organic coatings previously used.

Bisphenol A is under suspicion of developing hormone-like activities in the human organism, hence the demand for its disuse ("Bisphenol A, A Known Endocrine Disruptor" WWF European Toxics Programme Report, April 2000, page 11). The use of BADGE and BFDGE with the respective limiting values is controlled in Europe by Commission Directive 2002/16/EC (see also Council Directive 89/109/EEC, Directive 90/128/EEC), and the use of NOGE has been banned since the beginning of 2003 for coatings having direct food contact.

Polyesters in combination with crosslinking partners such as melamine resins, benzoguanamine resins or blocked polyisocyanates are generally suitable for the external lacquering of metal packaging articles. They are flexible and may be sterilized in water without problems and are thus part of the prior art (Protective Coatings, Clive H. Hare, Technology Publishing Company, Pittsburgh, USA, 1994, page 149; Tinplate and Modern Canmaking Technology, E. Morgan, Pergamon Press, Oxford, page 195 ff; Can making, The technology of metal protection and decoration, T. A. Turner, Blackie Academie Professional, London 1998, page 40 ff).

Titanium-dioxide-pigmented polyester-benzoguanamine lacquers are used for the internal coating of cans, in which case solely high-molecular-weight polyesters (Mn>12 000) offer sufficient sterilization stability in acidic filled contents.

U.S. Pat. No. 6,472,480 describes polyesters in combination with phenoxy-group-containing resins or amino-group-containing resins. All polyesters suitable for the application must contain naphthalenedicarboxylic acid and also have branched structures by using trifunctional monomers such as TMA or TMP. The suitability of this coating composition, especially for sterilizations in acid media, is questionable.

DE 199 12 794 (Grace) describes BADGE-free can coatings, but includes bisphenol A as a component (see polyester 5, table V, comparative example B).

Kansai Paint Co. describes polyester phenol coatings which likewise contain bisphenol A. (JP 200220141, JP 200113147, JP 11315251).

GB 349464 (ICI) describes the use of "glyptal resins" (polyesters from glycerol and phthalic anhydride) in combination with phenol-formaldehyde resoles and urea-formaldehyde resins in aqueous emulsions. These coating compositions are not suitable for the application "metal packaging lacquers".

The polyester-phenoplast coatings described in GB 1119091 (Schenectady) are intended for electrical insulation lacquers (wire enamels).

The heat-curable coating composition described in DE 22 28 288 (Stolllack) describes phenol-alkyd resin lacquers which are intended to avoid the phenomenon of sulfurizing. The proportion of the phenol-formaldehyde resin varies between at least 50% to 95%. If the proportion of phenol falls to 30%, the resultant lacquer is sticky. The binder used is of the alkyd type, that is to say an oil-containing polyester, and is used at 10 to 30%. The adhesion of this coating composition after mechanical shaping and sterilization was not described and is still questionable.

DE 40 10 167 (BASF) describes a process for the interior coating of metal sheet packaging. The coating compositions described are a carboxyl-group-containing polyester and a phenol resin. Disadvantages of this invention are the use of one or more epoxy resins to improve adhesion, and also the use of thermoplastic resins.

WO 95/23198 (DSM) describes the use of a hydroxyl-group-containing polyester for the interior coating of cans. Disadvantages of these described polyesters are that they must have a glass transition temperature of at least 40° C., and, inter alia, epoxy resins must be used as crosslinking partners.

Polyester-phenol-formaldehyde combinations exhibit after shaping what are termed microcracks, for example at the corners of cans or at wedge-bend samples. These microcracks are faults in the coating and are therefore not suitable for use as interior protective lacquer of metal packages, since here the protective function of the coating is permanently disturbed (See example 8, table IX, coating agent C).

JP 2002302643A describes the use of branched copolyesters for interior coating of cans. The crosslinker used is not described. Mention is made of generic terms such as aminoplast resins, phenolic resins, melamine resins, polyfunctional isocyanates, blocked isocyanates and polyfunctional aziridine resins which are used as crosslinkers of polyesters. This merely represents the general state of knowledge of the crosslinking reaction of polyesters (see: Lackharze [lacquer resins]; D. Stoye, W. Freitag; page 47; Carl Hanser Verlag, Munich 1996).

None of the patents describe the use of saturated hydroxyl-containing copolyesters in combination with phenol-formaldehyde resins, benzoguanamine resins and/or blocked polyisocyanates.

SUMMARY OF THE INVENTION

The present invention provides a coating composition comprising
A) 55 to 75% by weight of at least one hydroxyl-containing polyester;
B) 5 to 13% by weight of a phenol-formaldehyde resin;
at least one of
C) 0 to 12% by weight of a benzoguanamine-formaldehyde resin and
D) 0 to 10% by weight of a blocked polyisocyanate;
E) 0.5 to 2% by weight of a catalyst; and
F) 5 to 30% by weight of at least one solvent.

Preferably, the amounts of components A to F in the composition sum to 100% by weight.

The coating composition is suitable for metal packages of tinplate, aluminum and TFS. The coating agent is free from bisphenol A, bisphenol A diglycidyl ether, bisphenol F diglycidyl ether, novolac glycidyl ether and derivatives thereof, and also PVC and derivatives thereof. The coating composition is suitable for the interior and exterior coating of three-piece and deep-drawn metal packages and especially is able to replace the previously used interior protective coatings of epoxy-phenol resins, particularly with respect to shaping properties (wedge-bend test, square can) and chemical stability (MEK—strength, sterilization). Particularly suitable is the combination of the saturated hydroxyl-containing copolyesters described below with phenol-formaldehyde resins, benzoguanamine-formaldehyde resins and/or blocked polyisocyanates.

The copolyesters used are based only on raw materials which are permitted for direct food contact, in particular under "§ 175.300 FDA" (the US Food and Drug Administration) and/or the European regulation "2002/72/EC" (consolidated 90/128/EC).

The polyesters can be used without naphthalenedicarboxylic acid (see polyesters 1 to 4 below); likewise it was found that polyesters without a branched structure were also suitable (see polyesters 2, 3, 4 below).

Surprisingly, medium-molecular-weight copolyesters also exhibit high chemical resistance after sterilization with acetic acid and lactic acid.

Shaped metal coatings exhibit excellent sterilization stabilities, especially in acid media such as acetic acid and lactic acid, without losses in adhesion occurring. Specifically, these coatings, after mechanical shaping, do not have microcracks.

DETAILED DESCRIPTION OF PREFERRED EMBODIMENTS

The coating composition of the present invention comprises as component A) at least one hydroxyl-containing polyester; as component B) a phenol-formaldehyde resin; as component C) a benzoguanamine-formaldehyde resin; as component D) a blocked polyisocyanate; as component E) a catalyst; and as component F) at least one solvent.

Polyesters A)

The polyesters A) are prepared by condensation according to known processes (see Dr. P. Oldring, Resins for Surface Coatings, Volume III, published by Sita Technology, 203 Gardiness House, Broomhill Road, London SW18 4JQ, United Kingdom 1987). The polyesters used comprise a di- and/or polycarboxylic acid mixture and a di- or polyol mixture. They are present in the coating composition at from 55 to 75% by weight, preferably from 56 to 73% by weight.

In detail, customary carboxylic acids and their esterifiable derivatives can be used, for example phthalic acid, isophthalic acid, terephthalic acid, 1,4-cyclohexanedicarboxylic acid, succinic acid, sebacic acid, methyltetrahydrophthalic acid, methylhexahydrophthalic acid, tetrahydrophthalic acid, dodecanedioic acid, adipic acid, azelaic acid, naphthalenedicarboxylic acid, pyromellitic acid, dimer fatty acids and/or trimellitic acid, acid anhydrides thereof and/or lower alkyl esters, for example methyl esters.

Those which are preferably used are isophthalic acid, terephthalic acid, adipic acid, sebacic acid, dimer fatty acid, trimellitic acid, their acid anhydrides and/or esterifiable derivatives.

The alcohol components used are, for example, ethylene glycol, 1,2- and/or 1,3-propanediol, diethylene glycol, dipropylene glycol, triethylene glycol, tetraethylene glycol, 1,4-butanediol, 1,3-butylethylpropanediol, 2-methyl-1,3-propanediol, 1,5-pentanediol, cyclohexanedimethanol, glycerol, 1,6-hexanediol, neopentyl glycol, trimethylolethane, trimethylolpropane, 1,4-benzyldimethanol and -ethanol, 2,4-dimethyl-2-ethylhexane-1,3-diol, Dicidol; those which are preferably used are 1,3-methylpropanediol, NPG, ethylene glycol, trimethylolpropane.

In particular, the monomers should be permitted under "§ 175.300 FDA" and/or comply with the European regulation "2002/72/EC".

The copolyesters feature an acid value between 0 and 10 mg of KOH/g, preferably 0 to 5 mg of KOH/g, in particular 0 to 3 mg of KOH/g, a hydroxyl number between 3 and 80 mg of KOH/g, preferably between 10 and 50 mg of KOH/g, in particular from 15 to 30 mg of KOH/g, a glass transition temperature (Tg) between −20° C. and +50° C., preferably between −10° C. and +40° C., a linear or branched structure, preferably linear or slightly branched, particularly preferably linear, a molecular weight (Mn) between 2 000 and 20 000.

Phenol-Formaldehyde Resins B)

The phenol-formaldehyde resins B) are used in amounts of 5 to 13% by weight, preferably from 6 to 12% by weight.

Preferably, phenolic resins of the resole type are used, for example phenol, butylphenol, xylenol- and cresol-formaldehyde types, the types specifically etherified with butanol being particularly preferred (for the chemistry, preparation and use of the phenolic resins see "The Chemistry and Application of Phenolic Resins or Phenoplasts", Volume V, Part I, edited by Dr. Oldring; John Wiley and Sons/Sita Technology Ltd, London, 1997.)

Phenolic resins used are, for example: PHENODUR® PR 285 (55%), PR 612(80%), Vianova Resins, Mainz-Kastel, BAKELITE® 6581 LB (n-butanol-etherified cresol resol), Bakelite, Iserlohn-Letmathe.

Benzoguanamine-Formaldehyde Resins C)

The benzoguanamine-formaldehyde resins C) are used in amounts of from 0 to 12% by weight, preferably from 2 to 10% by weight. Preferably, those which are used are the fully etherified, especially preferably the butanol- or mixed methanol/ethanol-etherified benzoguanamine-formaldehyde resins (2,4-diamino-6-phenyl-1,3,5-triazine); (on the chemistry, preparation and use see "The Chemistry and Application of Amino Crosslinking Agents or Aminoplasts", Volume V, Part II, page 21 ff., edited by Dr. Oldring, John Wiley and Sons/Sita Technology Ltd, London 1998). Use can be made of, inter alia, the following commercially available benzoguanamines: MAPRENAL® MF 980 (55% in n-butanol), 988 (80% in n-butanol), Vianova Resins, Mainz-Kastel; CYMEL® 1123 (98%), Cytec, Neuss; LUWIPAL B017 (85% in isobutanol) BASF, Ludwigshafen.

Blocked Polyisocyanates D)

Preferably, those which are used are aliphatic and/or cycloaliphatic blocked polyisocyanates, for example HDI (hexamethylene diisocyanate), IPDI (isophorone diisocyanate), $H_{12}$MDI and trimers thereof. In particular, the polyisocyanates prepared using the following blocking agents were used:

n-butanone oxime, E-caprolactam, secondary amines, for example VESTANAT® B 1358 A (63% in SN 100), VESTANAT® EP B 1186 A (60% in SN 100), VESTANAT® EP B 1299 SV (53% in SN 100), Degussa, Marl; DESMODURBL 3175 (75% in SN 100), Bayer, Leverkusen. The blocked polyisocyanates are present in the inventive coating composition in amounts of from 0 to 10% by weight, preferably from 5 to 9% by weight.

In embodiments, either component C) or component D) is present alone or together in the coating composition. Preferably, if D) is absent, then C) is present at from 5 to 10% by weight. If C) is absent, then D) is present at from 6 to 9% by weight. If both C) and D) are present, then preferably the amount of C) is from 2 to 5% by weight and the amount of D) is from 5 to 8% by weight.

Catalysts E)

Generally, acid catalysts can be used. Catalysts that are particularly suitable in the case of table I are acid catalysts, for example phosphoric acid solutions, phosphoric ester solutions such as ADDITOL® & XK 406 (derivative of phosphoric acid), Vianova Resins, Mainz-Kastel; phosphoric acid solution (85% phosphoric acid in butyl glycol 1:1). Generally, tin catalysts can be used: preferably those which are used are dibutyltin dilaurate (=DBTL) in table II and III, for example Metatin 712, Acima, Buchs, Switzerland.

Solvents F)

Solvents which can be used include aromatic hydrocarbons (for example solvent naphtha 150, 200), glycol ethers and glycol esters (for example butyl glycol (=BG), methoxypropanol (=MP), butyl glycol acetate (=BGA), methoxypropyl acetate (=MPA)).

Aids and additives can also be present, for example lubricants (polyethylene wax, PTFE wax, camauba wax), fillers (titanium dioxide, zinc oxide, aluminum), matting agents (precipitated silica), wetting agents and dispersants, defoamers (modified siloxanes).

Production of the Coating Agents:

The coating agents are produced by intensive mixing of the components at temperatures of from 20 to 80° C. ("Lehrbuch der Lacktechnologie" [Textbook of lacquer technology], Th. Brock, M. Groteklaes, P. Mischke, edited by V. Zorll, Vincentz Verlag, Hannover, 1998, page 229 ff.). Components which are not liquid are first dissolved in a suitable solvent before mixing, then the remaining components are added with stirring.

The coating agents have a high solvent stability, for example in methyl ethyl ketone (MEK) at up to 100 double rubs. The inventive coating agents are highly flexible and adherent, which is reflected in the small amount of damage in the wedge-bend test (from 0 to 13 mm of damage).

The inventive coating agents are used for lacquering the interior and exterior of three-piece and deep-drawn metal packaging articles such as cans, lids and closures. The lacquered metals may be shaped mechanically, for example by deep-drawing, creasing and flanging, and then sterilized, especially in acetic acid and lactic acid, without exhibiting losses of adhesion. Thus square cans may be stamped having a 5, 10, 15 and 20 mm radius of the corners, and cups may be drawn having a drawing ratio of diameter to height of 1:0.75 and 1:1.3, without adhesion losses occurring.

The coating agents have a faultless course on the metallic substrates used and are free from surface interference, such as for example craters and wetting interference.

The coating agents have a solids content of 35% to 45%, preferably 37% to 42%, the efflux viscosity DIN 4 mm (20° C.) being from 95 sec to 110 sec.

EXAMPLES

The invention is described in more detail by the following examples. (The percentages given in the tables are standardized to 100)

Polyester Examples for Tables I, I/A, II, II/A, AND III

The mol % of the carboxylic acid component and the alcohol component are standardized separately to 100 mol %. The polyesters are dissolved in solvent naphtha 150/butyl glycol (4/1).

Polyester 1

Composition of 55% solution: terephthalic acid 40%, isophthalic acid 30%, sebacic acid 30% //neopentyl glycol 37%, methylpropanediol 60%, trimethylolpropane 3%.

Viscosity: 4.0 Pas, acid value: 0.2 mg of KOH/g, hydroxyl number: 25 mg of KOH/g, glass transition temperature: 0° C., molar mass (theoretical) 5 800.

Polyester 2

Composition of 55% solution: terephthalic acid 30, isophthalic acid 40, sebacic acid 30//neopentyl glycol 100, viscosity: 1.6 Pas, acid value: 1.3 mg of KOH/g, hydroxyl number: 21 mg of KOH/g, glass transition temperature: 7° C., molar mass (theoretical) 5 800.

Polyester 3

Composition of 55% solution: terephthalic acid 50, isophthalic acid 20, sebacic acid 30//methylpropanediol 100, viscosity: 2.5 Pas, acid value: 0.7 mg of KOH/g, hydroxyl number: 22 mg of KOH/g, glass transition temperature: −9° C., molar mass (theoretical) 5 800.

Polyester 4

Composition of 30% solution in solvent naphtha 150: terephthalic acid 30, isophthalic acid 63, dimer fatty acid 7//neopentyl glycol 52, ethylene glycol 48, viscosity: 0.6 Pas, acid value: 0.9 mg of KOH/g, hydroxyl number: 5 mg of KOH/g, glass transition temperature: 40° C., molar mass (theoretical) 15 000.

Polyester 5 (Comparison) Polyester Example for Table V (Reworking of the polyester described in the Grace patent DE 199 12 794)

Composition polyester 5, polyester 50% in solvent naphtha/BG (4/1): Terephthalic acid 26.1, isophthalic acid 34.6, adipic acid 39.3//I neopentyl glycol 51.1, ethylene glycol 43.0, trimethylolpropane 5.9, viscosity: 2.7 Pas, acid value: 4 mg of KOH/g, hydroxyl number: 34 mg of KOH /g.

Composition of the Coating Agents

Coating agent I: Polyester from example 1, phenol resin, benzoguanamine, catalyst, solvent

TABLE I

| | Percent by weight of the solutions |
|---|---|
| A) Polyester 1 | 57.3% |
| B) Phenol-formaldehyde resin PHENODUR ® PR 285 | 6.3% |
| C) Benzoguanamine resin MAPRENAL ® MF 980 | 9.0% |
| E) Catalyst ADDITOL ® XK 406 | 1.4% |
| F) Solvent (MPA/BGA = 1/1) | 26% |

TABLE I/A

| | Percent by weight of the solutions |
|---|---|
| A) Polyester 3 | 57.3% |
| B) Phenol-formaldehyde resin PHENODUR ® PR 285 | 6.3% |
| C) Benzoguanamine resin MAPRENAL ® MF 980 | 9.0% |
| E) Catalyst ADDITOL ® XK 406 | 1.4% |
| F) Solvent (MPA/BGA = 1/1) | 26% |

Coating agent II: Polyester from example 2, phenol resin, blocked polyisocyanate, catalyst, solvent

TABLE II

| | Percent by weight of the solutions |
|---|---|
| A) Polyester 2 | 56% |
| B) Phenol-formaldehyde resin BAKELITE ® 6581 | 6.5% |
| C) Blocked polyisocyanate VESTANAT ® B 1358 | 8.6% |

TABLE II-continued

| | Percent by weight of the solutions |
|---|---|
| E) Catalyst METATIN ® 712 | 0.6% |
| F) Solvent (MPA/BGA = 1/1) | 28.3% |

Coating agent II/1: polyester from example 3 and example 4, phenol resin, blocked polyisocyanate, catalyst, solvent

TABLE II/A

| | Percent by weight of the solutions |
|---|---|
| A) Polyester 3 | 19.4% |
| Polyester 4 | 53.2% |
| B) Phenol-formaldehyde resin PHENODUR ® PR 285 | 12% |
| D) Blocked polyisocyanate VESTANAT ® B 1358 | 7.5% |
| E) Catalyst METATIN ® 712 | 0.3% |
| F) Solvent (MPA/BGA = 1/1) | 7.6% |

Coating agent III: polyester from example 2; phenol resin, benzoguanamine, blocked polyisocyanate, catalyst, solvent

TABLE III

| | Percent by weight of the solutions |
|---|---|
| A) Polyester 2 | 58% |
| B) Phenol-formaldehyde resin PHENODUR ® PR 285 | 6.4% |
| C) Benzoguanamine MAPRENAL ® MF 980 | 3.0% |
| D) Blocked polyisocyanate VESTANAT ® B 1358 | 5.6% |
| E) Catalyst METATIN ® 712 | 0.6% |
| F) Solvent (MPA/BGA = 1/1) | 26.4% |

Comparative Example A

Coating agent A: epoxy resin, phenol resin, catalyst, solvent

TABLE IV

| | Percent by weight of the solution |
|---|---|
| Epoxy resin EPIKOTE ® 1009 (35% solution of MPA/BGA = 1/1) | 71.43% |
| Phenol resin PHENODUR ® PR 897 (53%) | 15.7% |
| Catalyst (85% H$_3$PO$_4$ in BG = 1:1) | 0.4% |
| Solvent (MPA/BG = 1/1) | 12.47% |

Crosslinking ratio: epoxy resin (solid resin): phenol-formaldehyde resin (solid resin)=75:25 Epikote 1 009 (Shell, Eschbom), Phenodur PR 897 (Vianova Resins, Mainz-Kastel)

Comparative Example B

Coating agent B: polyester 5, phenol resin, catalyst, solvent (Polyester similar to example 1 from DE 199 12 794)

TABLE V

| | Percent by weight of the solution |
|---|---|
| Polyester 5 | 70% |
| Phenol-formaldehyde resin, PHENODUR ® PR 401 (72%) | 12.1% |

TABLE V-continued

| | Percent by weight of the solution |
|---|---|
| Catalyst (85% H$_3$PO$_4$ in methoxypropanol = 4:1) | 1.0% |
| Solvent Solvesso 100/MPA (1:1) | 16.9% |

Comparative Example C

Coating agent C: polyester 1 or 2 or 3, phenol resin, catalyst, solvent

TABLE VI

| | Percent by weight of the solution |
|---|---|
| Polyester 55% solution polyester 1/2/3 | 60.4% |
| Phenol-formaldehyde resin Phenodur PR285 | 10.9% |
| Catalyst Additol XK 406 | 1.5% |
| Solvent (MPA/BGA = 1:1) | 27.2% |

Abbreviations:
MPA = methoxypropyl acetate
BG = butyl glycol
BGA = butyl glycol acetate Evaluation of the Coatings The coating agents are applied to tinplate at approximately 5 to 7 g/m$^2$ (dry film weight) and baked at the temperatures customary for can coating of 205° C. (pmt=peak metal temperature) for 13 min (oven dwell time). The crosslinking is tested for completeness using methyl ethyl ketone (MEK), also familiar to those skilled in the art under the name "MEK double rubs". As a test of flexibility of the coating, a method known to those skilled in the art, the "wedge-bend test", is carried out. As further tests, the coated sheets are shaped with a stamp to form square cans. These cans are sterilized in water, 3% acetic acid and 2% lactic acid at 129° C. for 30 min. After the sterilization the coating is assessed with respect to adhesion and surface properties at the four different corners. In particular, both in the wedge-bend test and the square can, the occurrence of "blushing" was evaluated.

TABLE VII

| | Example 1 Coating agent I | Example 2 Coating agent II | Example 3 Coating agent I/A |
|---|---|---|---|
| MEK-Test (a.) | >100 | 24 | 90 |
| Wedge-bend test in mm (b.) | 10 | 5 | 13 |
| Blushing | ok | ok | ok |
| Adhesion square can (c.) | 1/1/1/1 | 1/1/1/1 | 1/1/1/1 |
| Adhesion, sterilization H$_2$O (d.), | 4/1/1/1 | 1*/1/1/1 | 1/1/1/1 |
| surface (e.), water absorption (f.) | 1–2 | 4 | 2 |
| Adhesion, 3% acetic acid (d.), | 4*/1*/1*/1* | 1*/1*/1*/1* | 1*/1*/1*/1* |
| surface (e.), water absorption (f.) | 2–3 | 3 | 3 |
| Adhesion, 2% lactic acid (d.), | 4/3/1*/1* | 1*/1*/1*/1* | 1*/1*/1*/1* |
| surface (e.), water absorption (f.) | 4–5 | 3–4 | 3 |

TABLE VIII

| | Example 4 Coating agent I | Example 5 Comparison epoxy-phenol coating agent A | Example 6 Comparison polyester-phenol (Grace patent) coating agent B |
|---|---|---|---|
| MEK-Test (a.) | 100 | 100 | 100 |
| Wedge-bend test in mm (b.) | 0 | 25 | 40 |
| Blushing | ok | ok | ok |
| Adhesion square can (c.) | 1/1/1/1 | 3/1/1/1 | 3/3/1/1 |
| Adhesion, sterilization H$_2$O (d.), | 1/1/1/1 | 4/3*/1/1 | 4/3*/1/1 |
| surface (e.), water absorption (f.) | 2 | 1–2 | 3 |
| Adhesion, 3% acetic acid (d.), | 1*/1*/1*/1* | 4/4/1*/1* | 4/4/3*/1* |
| surface (e.), water absorption (f.) | 3 | 2–3 | 4–5 |
| Adhesion, 2% lactic acid (d.) | 1*/1*/1*/1* | 4/4/1*/1* | 4/4/4/3* |
| surface (e.), water absorption (f.) | 4–5 | 3–4 | 4–5 |

TABLE IX

|  | Example 7 Coating agent III | Example 8 Coating agent C |
|---|---|---|
| MEK-Test (a.) | >100 | 5/1/2 |
| Wedge-bend test in mm (b.) | 0 | >80/25/>80 |
| Blushing | ok | yes/yes/yes |
| Adhesion square can (c.) | 1/1/1/1 | —/—/— g. |
| Adhesion, sterilization H₂O (d.), surface (e.), water absorption (f.) | 1/1/1/1 3 | —/—/— g. |
| Adhesion, 3% acetic acid (d.), surface (e.), water absorption (f.) | 1*/1*/1*/1* 4 | —/—/— g. |
| Adhesion, 2% lactic acid (d.) surface (e.), water absorption (f.) | 1*/1*/1*/1* 5 | —/—/— g. | a. Number of double rubs with 1 kp weight
b. mm of damaged coating
c. Four corners of 5/10/15/20 mm radius: 1 = no adhesion loss, 2 = 25%, 3 = 50%, 4 = 75% adhesion loss, 0 = total loss of adhesion.
d. After sterilization evaluation as under c.
e. Surface roughness* = slightly roughened
f. Visual aspect from 1 (no water absorption) to 5 (heavy water absorption)
g. Not tested, since unsuitable The comparative example 6 (Table VIII), coating agent B as comparison with the inventive coating agents clearly shows that the coating agent B is unsuitable for the intended application, since not only the wedge-bend test (40 mm defective) but also the square can (5 and 10 mm corners already 50% damaged before the sterilization) exhibits clear mechanical damage. After the sterilization in acid media, the adhesion has been completely lost.

On the basis of comparative example 8 (Table IX) it is shown that in the case of exclusively phenol resin crosslinking, no suitable coating agents may be obtained.

Comparative example 5 (Table VIII, epoxy phenol) shows the good chemical stability after sterilization in acid media; it shows the current technical standard of coatings of metal packaging articles which should be at least achieved by alternative coating agents without using epoxy resins.

The inventive examples coating agents 1, 2, 3 and 4 (avoidance of epoxy and bisphenol A) are markedly superior to the comparative example 5 with respect to flexibility (wedge-bend test and square can) and of equal performance with respect to adhesion and flexibility after sterilization.

The disclosure of the priority document, German Application No. 103 32 723.1, filed Jul. 18, 2003, is incorporated by reference herein in its entirety.

Obviously, numerous modifications and variations of the present invention are possible in light of the above teachings. It is therefore to be understood that within the scope of the appended claims, the invention may be practiced otherwise than as specifically described herein.

What is claimed is:

1. A coating composition comprising as components
   A) 55 to 75% by weight of at least one hydroxyl-containing polyester;
   B) 5 to 13% by weight of a phenol-formaldehyde resin; at least one of
      C) 0 to 12% by weight of a benzoguanamine-formaldehyde resin and
      D) 0 to 10% by weight of a blocked polyisocyanate;
   E) 0.5 to 2% by weight of a catalyst; and
   F) 5 to 30% by weight of a solvent,
wherein the sum of the compounds A to F is 100 % by weight.

2. The coating composition as claimed in claim 1, wherein the polyester used as component A) comprises at least one acid component selected from the group consisting of phthalic acid, isophthalic acid, terephthalic acid, 1,4-cyclohexanedicarboxylic acid, succinic acid, sebacic acid, methyltetrahydrophthalic acid, methylhexahydrophthalic acid, tetrahydrophthalic acid, dodecanedioic acid, adipic acid, azelaic acid, naphthalenedicarboxylic acid, pyromellitic acid, dimer fatty acids, and trimellitic acid.

3. The coating composition as claimed in claim 1, wherein the polyester used as component A) comprises at least one alcohol component selected from the group consisting of ethylene glycol, 1,2-propanediol, 1,3-propanediol, diethylene glycol, dipropylene glycol, triethylene glycol, 1,4-butanediol, 1,3-butylethylpropanediol, 2-methyl-1,3-propanediol, 1,5-pentanediol, cyclohexanedimethanol, glycerol, 1,6-hexanediol, neopentyl glycol, trimethylolethane, trimethylolpropane, 1,4-benzyldimethanol, 1,4-benzyldiethanol, 2,4-dimethyl-2-ethylhexane-1,3-diol and dicidol.

4. The coating composition as claimed in claim 1, wherein the polyester used as component A) has
   an acid value of from 0 to 10 mg of KOH/g,
   a hydroxyl number of from 3 to 80 mg of KOH/g,
   a glass transition temperature of from −20 to +50° C., and
   a molecular weight (Mn) of from 2000 to 20000.

5. The coating composition as claimed in claim 1, wherein the polyester used as component A) has an acid value of from 0 to 5 mg of KOH/g.

6. The coating composition as claimed in claim 1, wherein the polyester used as component A) has an acid value of from 0 to 3 mg of KOH/g.

7. The coating composition as claimed in claim 1, wherein the polyester used as component A) has a hydroxyl number of from 10 to 50 mg of KOH/g.

8. The coating composition as claimed in claim 1, wherein the polyester used as component A) has a hydroxyl number of from 15 to 30 mg of KOH/Jg.

9. The coating composition as claimed in claim 1, wherein the polyester used as component A) has a glass transition temperature of from −10 to +40° C.

10. The coating composition as claimed in claim 1, wherein the polyester used as component A) has a linear structure.

11. The coating composition as claimed in claim 1, wherein the polyester used as component A) has a branched structure.

12. The coating composition as claimed in claim 1, wherein the polyester used as component A) has a molecular weight (Mn) of from 2000 to 20000.

13. The coating composition as claimed in claim 1, wherein the component B) comprises a resol phenol resin.

14. The coating composition as claimed in claim 1, wherein the component B) is selected from the group consisting of etherified xylenol-formaldehyde resins and etherified cresol-formaldehyde resins.

15. The coating composition as claimed in claim 1, wherein the coating composition comprises 2 to 10% by weight of the benzoguanamine-formaldehyde resin of the component C).

16. The coating composition as claimed in claim 1, wherein the benzoguanamine-formaldehyde resin of the component C) is completely etherified with butanol or a mixture of methanol and ethanol.

17. The coating composition as claimed in claim 1, wherein the coating composition comprises 5 to 9% by weight of the blocked polyisocyanate of the component D).

18. The coating composition as claimed in claim 1, wherein blocked polyisocyanate of the component D) is at least one of an aliphatic blocked polyisocyanate and a cycloaliphatic blocked polyisocyanate.

19. The coating composition as claimed in claim 1, wherein the blocked polyisocyanate of the component D) is based on at least one member of the group consisting of HDI, IPDI and $H_{12}$MDI.

20. The coating composition as claimed in claim 1, wherein the catalyst used as component E) comprises an acid or an organometallic compound.

21. The coating composition as claimed in claim 1, wherein the catalyst used as component E) comprises a member of the group consisting of phosphoric acid, phosphoric acid derivatives, and tin catalysts.

22. The coating composition as claimed in claim 1, wherein the solvent used as component F) comprises at least one selected from the group consisting of aromatic hydrocarbons, glycol ethers and glycol esters.

23. The coating composition as claimed in claim 1, further comprising at least one of aids and additives.

24. A method of making a coating composition, the method comprising mixing, at a temperature in a range of from +20 to +80° C.,
  A) at least one hydroxyl-containing polyester;
  B) a phenol-formaldehyde resin;
  at least one of
    C) a benzoguanamine-formaldehyde resin and
    D) a blocked polyisocyanate;
  E) a catalyst; and
  F) a solvent, and
producing the composition of claim 1.

25. A method of using a coating composition, the method comprising lacquering the coating composition of claim 1 on at least one of a metal coil and a metal sheet.

26. A method of using a coating composition, the method comprising lacquering the composition of claim 1 on at least one of an exterior surface and an interior surface of a metal packaging article.

27. The method as claimed in claim 26, further comprising mechanically shaping the metal packaging article by at least one of deep-drawing, flanging, stamping and creasing.

28. A coated metal article produced by coating the composition of claim 1 on a surface of a metal article.

29. A coating composition comprising as components
  A) 55 to 75% by weight of at least one hydroxyl-containing polyester;
  B) 5 to 13% by weight of a phenol-formaldehyde resin;
  at least one of
    C) a benzoguanamine-formaldehyde resin and
    D) a blocked polyisocyanate;
  E) 0.5 to 2% by weight of a catalyst; and
  F) 5 to 30% by weight of a solvent,
  wherein if D) is absent, then the amount of C) is from 5 to 10% by weight,
    wherein if C) is absent, then the amount of D) is from 6 to 9% by weight,
  wherein if both C) and D) are present, then the amount of C) is from 2 to 5% by weight and the amount of D) is from 5 to 8% by weight, and
  wherein the sum of the compounds A to F is 100% by weight.

* * * * *